United States Patent
Puz et al.

(10) Patent No.: US 7,171,413 B2
(45) Date of Patent: Jan. 30, 2007

(54) TWO PHASE INTERMEDIATE QUERY SECURITY USING ACCESS CONTROL

(75) Inventors: Nicholas K. Puz, San Jose, CA (US); Randal J. Richardt, San Jose, CA (US); Rupa Bhaghavan, San Jose, CA (US); Vitaliy Bondar, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 10/651,892

(22) Filed: Aug. 29, 2003

(65) Prior Publication Data

US 2005/0050046 A1 Mar. 3, 2005

(51) Int. Cl.
*G06F 17/30* (2006.01)
(52) U.S. Cl. ............................................. 707/9; 707/10
(58) Field of Classification Search .............. 707/1–10, 707/100–104.1
See application file for complete search history.

(56) References Cited

U.S. PATENT DOCUMENTS

| | | | | |
|---|---|---|---|---|
| 4,930,071 A | * | 5/1990 | Tou et al. ...................... | 707/4 |
| 5,317,729 A | | 5/1994 | Mukherjee et al. | |
| 5,689,698 A | | 11/1997 | Jones et al. | |
| 5,873,083 A | * | 2/1999 | Jones et al. ...................... | 707/4 |
| 6,012,067 A | | 1/2000 | Sarkar | |
| 6,263,330 B1 | | 7/2001 | Bessette | |
| 6,813,617 B1 | * | 11/2004 | Wong et al. .................... | 707/4 |
| 6,820,082 B1 | * | 11/2004 | Cook et al. ...................... | 707/9 |
| 2002/0156792 A1 | | 10/2002 | Gombocz et al. | |

* cited by examiner

*Primary Examiner*—Mohammad Ali
*Assistant Examiner*—Sangwoo Ahn
(74) *Attorney, Agent, or Firm*—Fay, Sharpe, Fagan, Minnich & McKee, LLP

(57) ABSTRACT

A method, system and article of manufacture for two phase intermediate query security using access control. A networked client-server computer system having a plurality of users of the client-server system and including software performing database queries via a DBMS for users of the system implements the method. The method includes receiving a query string from one of the users by the client system, the query string including references to database objects. The received query string is transformed by the client system to an intermediate query string, and a first phase query security is performed by the client system including identifying the referenced database objects and inserting a security marker into the intermediate query string for each respective identified database object, and sending the intermediate query string to the server system. Access control checks are performed by the server system on the inserted security markers in the intermediate query string, and the inserted security markers are replaced with corresponding DBMS code to enforce access control.

15 Claims, 4 Drawing Sheets

TWO PHASE INTERMEDIATE QUERY SECURITY USING ACCESS CONTROL

BACKGROUND OF THE INVENTION

CROSS REFERENCE TO RELATED APPLICATION

This application is related to co-pending U.S. patent application Ser. No. 10/367,086 titled "System and Method for Implementing Access Control for Queries to a Content Management System," which is assigned to the same assignee as the present application, and which is incorporated herein by reference.

FIELD OF THE INVENTION

The present invention relates to relational database query formulation and access control checks related to the query formulation on client-server systems using a query language, access marker formulation by client-side software and query language access control formulation by server-side software.

DESCRIPTION OF THE PRIOR ART

Users of a client-server system frequently access database tables stored in relational databases by formulating queries such as, for example, users of a content management system (CMS) generating Structured Query Language (SQL) to access a database. If a user-submitted query spans multiple database objects, or if the query selects items of one database object based on conditions in another database object, the CMS must check that the submitting user has access permissions to each of the database objects referenced in the query, regardless of whether or not the particular database object will be returned to the user. This leads to inefficiencies, particularly when a query spans multiple database objects or traverses through many database objects referenced by the query, as the client-side software of the CMS generates and submits the necessary SQL joins and conditions necessary to confirm that the user has the necessary access permissions.

The challenge is to provide a method and system that reduces the security overhead caused by user queries that span many database objects. Preferably, the access control overhead is distributed between the client-side software and the server-side software in such a way as to minimize the overhead.

BRIEF SUMMARY OF THE INVENTION

In accordance with the present invention, there is provided a method of two-phase query security in a networked client-server computer system including software performing database queries via a DBMS for users of the system. A query string is received from one of the users by the client system, the query string including references to database objects. The received query string is transformed by the client system to an intermediate query string, and a first phase query security is performed by the client system, including identifying the referenced database objects and inserting a security marker into the intermediate query string for each respective identified database object, and then sending the intermediate query string to the server system. During the second phase, access control checks are performed by the server system on the inserted security markers in the intermediate query string, and the inserted security markers are replaced with corresponding DBMS code to enforce access control.

In accordance with another aspect of the present invention, there is provided a client-server computer system having a plurality of users. The system includes software performing database queries via a DBMS for users of the system, a client system for receiving user queries, a server system for resolving the user queries and a communication network connecting the client system and the server system. Client-side software is running on the client system, including a means for transforming a received query into an intermediate query string, a means for identifying database objects included in the received query, a means for inserting a security marker into the intermediate query string for each identified database object, a means for sending the intermediate query string to the server system, and a means for receiving a resolved query from the server system. Server-side software running on the server system includes a means for performing access control checks on each of the inserted security markers in a received query string, a means for replacing each of the inserted security markers in the received intermediate query string with respective DBMS code for enforcing access control, a means for submitting the received intermediate query string to a DBMS, a means for receiving a query response from the DBMS, and a means for retuning the query response to the client system. A database is connected to the server system, and a DBMS is running on the server system for accessing the database and resolving received query strings and returning a resolved query response.

In accordance with still another aspect of the present invention, there is provided an article of computer-readable media having contents that cause a client-server computer system having a plurality of users of the network, and including software running on the client-server computer system, performing database queries via a DBMS for users of the system to perform steps of a computer-implemented method. A query string is received by the client system from one of the plurality of users, the query string including references to database objects. The received query string is transformed by the client system to an intermediate query string. A first phase query security is performed by the client system including identifying the referenced database objects and inserting a security marker into the intermediate query string for each respective identified database object, and sending the intermediate query string to the server system. Access control checks are performed by the server system on the inserted security markers in the intermediate query string, and the inserted security markers are replaced with corresponding DBMS code to enforce access control.

One benefit obtained from the present invention is a division of query access control labor between the client system and the server system, thereby sharing the overhead more efficiently.

Another benefit obtained from the present invention is that the server generates the query language code necessary to perform the security checks determined by the client and communicated via security markers. Thus, the security model may be changed at the server without impacting the client. Further, the security model can be extended by the server without impacting the application program interface (API) used by the client and server software.

Yet another benefit obtained from the present invention is that the DBMS can apply optimization to the query language code that contains both the main query and access control checks.

Still another benefit obtained from the present invention is that the primary server focus is on query language fragments and markers. Thus, the server-side code does not necessarily have to be modified to account for any changes made by the client regarding where markers are placed in the query language string.

Other benefits and advantages of the subject method and system will become apparent to those skilled in the art upon a reading and understanding of this specification.

BRIEF DESCRIPTION OF THE DRAWINGS

The invention may take physical form in certain parts and steps and arrangements of parts and steps, the preferred embodiments of which will be described in detail in this specification and illustrated in the accompanying drawings hereof and wherein.

DETAILED DESCRIPTION OF THE INVENTION

Figure 1:
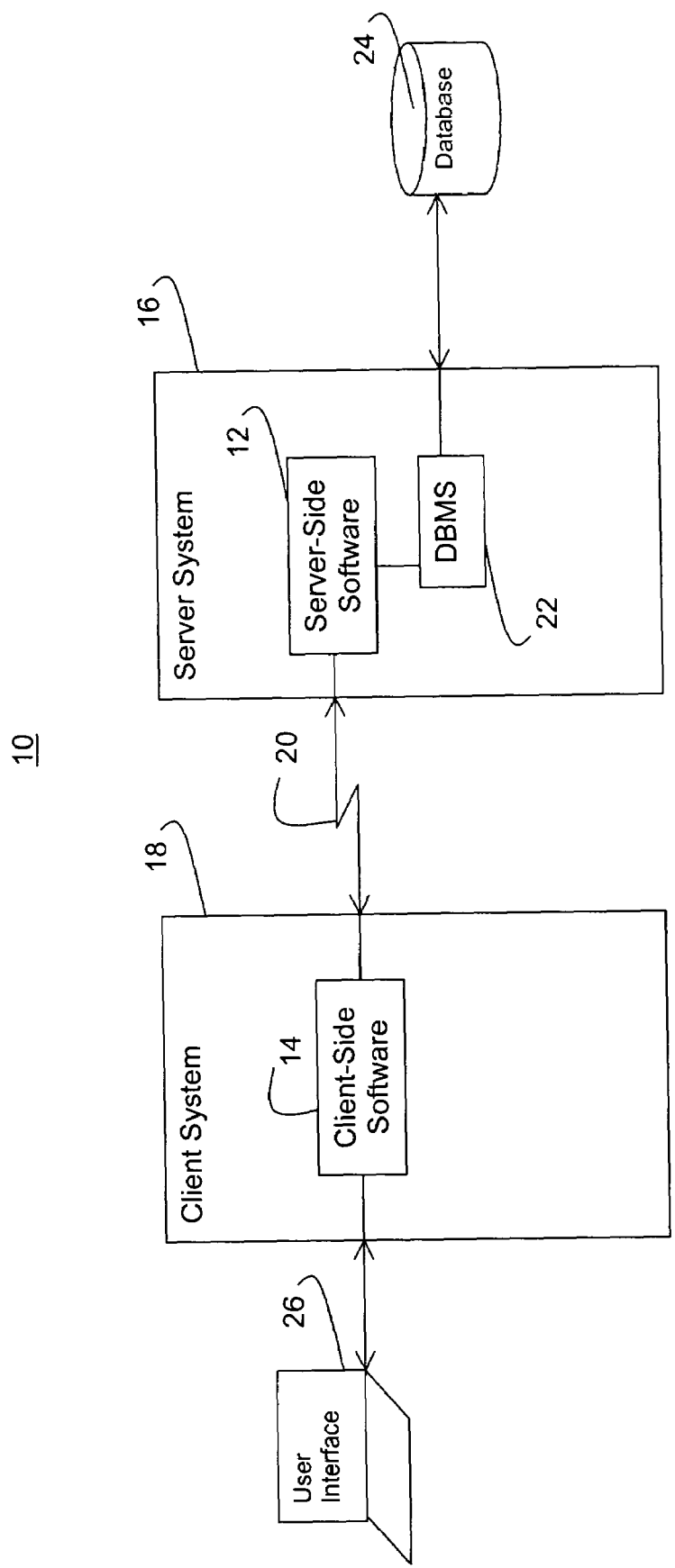
FIG. 1 is a block diagram of an exemplary client-server system suitable for practicing aspects of the present application.

Reference will now be made in detail to the preferred embodiment of the present invention, examples of which are illustrated in the accompanying drawings, wherein like reference numerals refer to like elements throughout.

The detailed description which follows is presented in terms of general procedures, steps and symbolic representations of operations of data bits within a computer memory, associated computer processors, networks, and network devices. These procedure descriptions and representations are the means used by those skilled in the data processing art to convey the substance of their work to others skilled in the art. A procedure is here, and generally, conceived to be a self-consistent sequence of steps or actions leading to a desired result. Thus, the term "procedure" is generally used to refer to a series of operations performed by a processor, be it a central processing unit of a computer, or a processing unit of a network device, and as such, encompasses such terms of art as "objects," "functions," "subroutines" and "programs."

The procedures presented herein are not inherently related to any particular computer or other apparatus. In particular, various general purpose machines may be used with programs in accordance with the teachings herein, or it may prove more convenient to construct more specialized apparatus to perform the required method steps.

However, one of ordinary skill in the art will recognize that there exists a variety of platforms and languages for creating software for performing the procedures outlined herein. One of ordinary skill in the art also recognizes that the choice of the exact platform and language is often dictated by the specifics of the actual system constructed, such that what may work for one type of general purpose computer may not be efficient on another type of general purpose computer.

One of ordinary skill in the art to which this invention belongs will have a solid understanding of content management systems, database management systems, and methods of securely controlling access to items managed by the content management system. It being recognized that such practitioners do not require specific details of the software, but rather find data structure descriptions and process descriptions more desirable (due to the variety of suitable hardware and software platforms), such specifics are not discussed to avoid obscuring the invention.

The invention is described in terms of a content management system generating SQL queries, however, this is done only to facilitate an understanding of the invention. One of ordinary skill in the art will readily recognize that the scope of the invention includes any client-server system providing users access to database objects, entities or tables. Further, the term database as used herein is not limited in scope to any particular type of database. The database may be, for example, any form of data repository, relational database or object-relational database.

FIG. 1 is a block diagram of a network-connected client-server system 10 in accordance with a preferred embodiment of the present invention. The system shown in FIG. 1 is particularly suited to delivery of content over a network or the Internet. A content management system 12, 14 includes server-side software 12 running on a server computer system 16 and client-side software 14 running on a client computer system 18.

The client and server systems communicate via a network 20. Only one client system 16 is shown in the figure. It is to be appreciated, however, that there may be many client systems connected to the server system 16 by the network 20 or other networks. Each client system may further have a plurality of users although features of the present application are described with respect to a single user. It is also to be appreciated that the server system 16 may also be a distributed system or include a plurality of systems.

The server computer system 16 also includes a database management system (DBMS) 22 for accessing records and tables stored on a database 24. A user at a user interface 26 connected to the client computer system 18 provides queries to the client-side CMS 14. In prior art systems, the prior-art client-side software 14 is responsible for receiving database query requests from the user and transforming those requests into relational database commands, SQL for example. The client-side software 14 would also have the responsibility for ensuring the user had proper access permission for each database object to be traversed during the query. This prior-art scheme imposes the aforementioned overhead in submitting SQL joins and access control commands for all of the database objects, including those that are only involved in a referential manner but not returned as part of the reply to the query.

Figure 2:
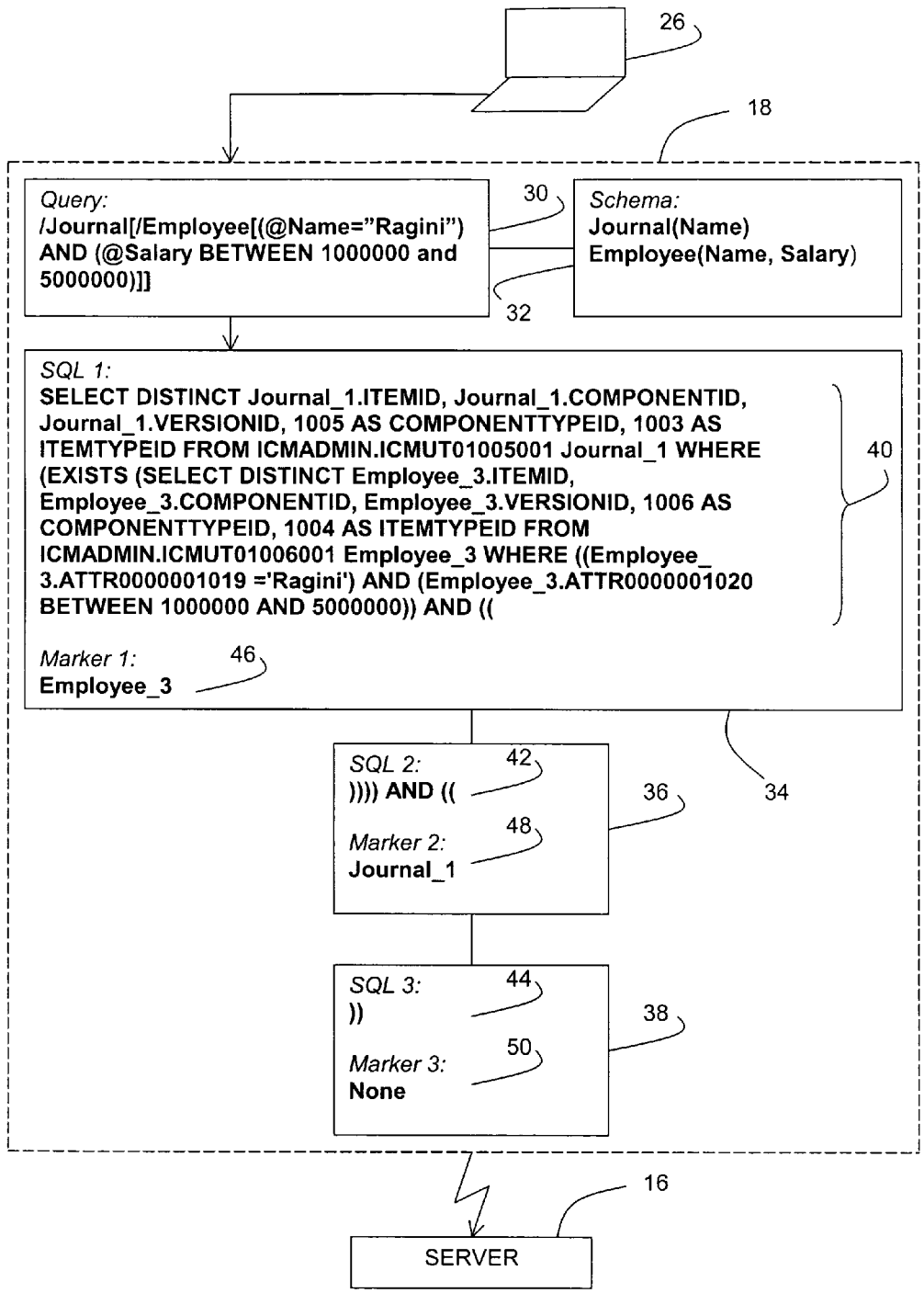
FIG. 2 is an illustration of exemplary client-side query processing.

In embodiments of the present application, the access control overhead is divided between the client-side software 14 and the server-side software 12 in an efficient and overhead-reducing manner. FIG. 2 illustrates concepts of the invention by means of an exemplary query 30 submitted by a user, the query involving a database schema 32 referencing a Journal table and an Employee table stored on the database 24 of FIG. 1. The client-side software 14 parses the query 30, converts it to a parse tree (not shown), and generates an SQL string. The parse tree is analyzed and, for each database object involved in the query, an appropriate security marker is inserted into the SQL string. Thus, the SQL string is divided into multiple query parts 34, 36, 38, each query part including an SQL part 40, 42, 44 and a respective security marker 46, 48, 50.

In the example shown in the figure, the first query part 34 includes a first SQL part 40 and a first security marker 46.

The first security marker 46 contains "Employee_3" as a result of the first SQL part 40 accessing the Employee data table referenced in the schema 32. The second query part 36 includes a second SQL part 42 and a second security marker 48. The second security marker 48 contains "Journal_1" as a result of the first SQL part 40 accessing the aforementioned Journal data table. The third query part 38 includes a third SQL part 44 which, as shown, includes only parentheses, and a null (non-existent) third security marker 50 indicating that no access checks are required for the third query part. In the illustrated embodiment, the final query part does not require access security checks since the final SQL part consists only of parentheses optionally inserted by the client-side software 14. It is to be appreciated that user queries are normally much longer than the exemplary query 30 and the resulting query will include more than 3 query parts.

Figure 3:
FIG. 3 is an illustration of exemplary sever-side query processing for the query of FIG. 2.

The exemplary client-side query parts 34, 36, 38 are sent to the server 16 for processing by the server-side software 12. The server-side software 12 receives the SQL query parts from the client system 18 as a single string. The server-side software 12 then performs access control list (ACL) checks on the security markers 46 in the received string and generates a final SQL string 60 as shown in FIG. 3. The final SQL string 60 is a single string, however, it has logical or identifiable parts corresponding to the received query parts. For example, the final SQL string 60 includes the first SQL part 40 followed by a first SQL security check 62 that corresponds to the first security marker 46. The server-side software 12 has, however, transformed the first security marker 46 to a respective SQL security check 62, in place of the first security marker. In like manner, the final SQL string 60 includes the second SQL part 42 and a respective second SQL security check 64 derived from the second security marker 48.

The final SQL string 60 includes the third SQL part 44. However, because there was no security marker 50 in the illustrated embodiment, there is no SQL security code generated for the third SQL part 44. It is also to be appreciated that, in some circumstances, no SQL security code will be generated for query parts other than the last, depending on the database objects accessed by the query. It is to be appreciated that, although the security markers are inserted by client-side software, the security rules pertaining to the database objects are known only on the server, the client is normally unaware of the security rules.

Figure 4:
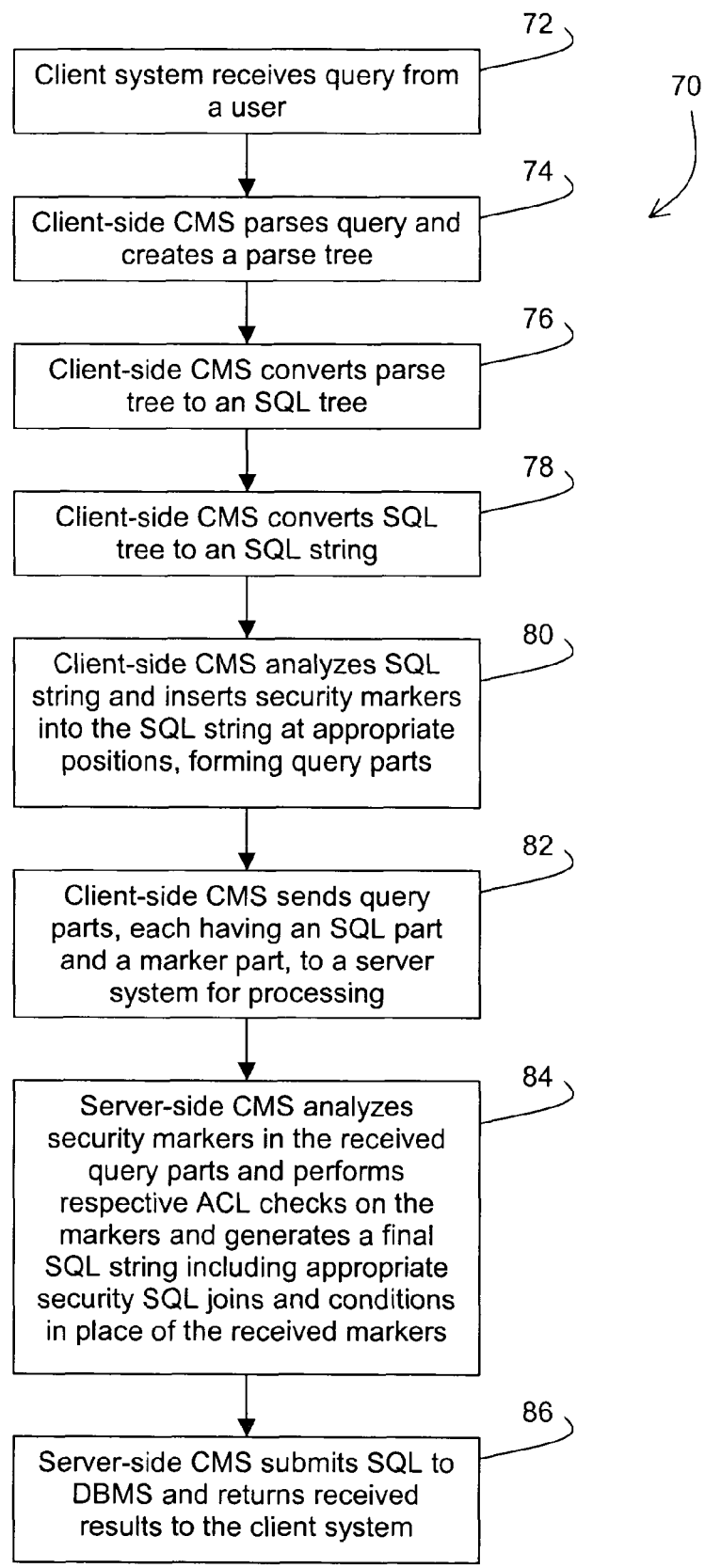
FIG. 4 is a flowchart of a method according to the present application.

With reference now to FIG. 4, a flowchart illustrates the preferred method 70 for two-phase intermediate query security using access control and SQL. A client system receives a database query from a user (72). A client-side CMS running on the client system parses the query and creates a parse tree (74). The client-side CMS next converts the parse tree to an SQL tree (76) and then converts the SQL tree to an SQL string (78) for further processing. At this point, the SQL string represents a valid SQL query suitable for submission to a database server system, however, the SQL does not contain any security code. Therefore, the client-side CMS analyzes the SQL string and inserts the aforementioned security markers into the SQL string at appropriate positions (80). Exemplary markers can be the names of database tables referenced by the query such as the previously described Employee and Journal database tables. The database tables do not necessarily provide query results but may be referenced in the query as a source of information to satisfy conditional relationships expressed in the query.

At this point, the query parts 34, 36, 38, each query part including the respective SQL part 40, 42, 44 and any respective inserted security marker 46, 48, are sent to a server system (82) for a second phase of query processing. A server-side CMS running on the server system receives each query part and processes the respective inserted security markers, if any. For each security marker received, ACL checks are performed and each security marker is replaced with respective SQL joins and conditions to form a final SQL string for submission to a DBMS (84). The final SQL string includes the client SQL (SQL parts) and the server-generated SQL, forming a single, final SQL string. ACL checks are well known to those of normal skill in the art.

The final SQL string is submitted by the server-side CMS to the DBMS for execution of the final SQL query, and the results of the query are returned by the server-side CMS to the client-side CMS (86). Details of the SQL query submission to the DBMS are not provided herein since the Structured Query Language and methods of submitting SQL queries to a variety of database management systems are well known in the art.

By distributing the above-described tasks of generating the main query 74–80 and generating the access control checks 84 between the client and the server respectively, the query engine achieves a very extensible and efficient solution to a rather complicated problem. To summarize and rephrase aspects of the present application for clarity, the client sends to the server a sequence of query parts, each of which consists of an SQL portion (what the user is looking for) and a marker portion (what should be protected by access control). The server then determines the required SQL joins and conditions that should be inserted in place of the markers in the main user query in order to enforce the appropriate access control rules.

Concepts of the present application facilitate independent optimizations and changes to the client-side and the server-side software. For instance, the client analyzes the parse tree and determines whether access control checks are redundant, and does not create markers to do ACL checks in such situations. This is advantageous since the server only deals with SQL fragments and markers, and the server-side code does not necessarily have to be changed to account for any changes made by the client regarding where markers are placed in the SQL string, as long as the information contained in a marker remains consistent.

It is also advantageous that the server generates the SQL code necessary to perform the security checks for each marker since the security model may be changed at the server without impacting the client. If the relations that contain security information change, or the security rules themselves change, the server can change the SQL joins created to perform the access control checks, but the client does not need to be changed. The server-side software can also be changed to make the ACL joins more efficient without impacting the client. This allows the security model to be extended by the server without impacting the application program interface (API) used by the client and server software.

Further, concepts of the present application shift some of the query processing load to the client system, providing needed relief to the server system. It is natural for the markers to be set by the client-side software because it has all the necessary information at its disposal during the SQL translation phase, such as, for example, any table alias used in the generated SQL, information about the underlying database table (such as whether it has certain columns necessary to do the access control checks) and knowledge of the tables being accessed, what is being projected, and the predicates involved. However, since the client-side software does not know the server's table structure or the specifics of the necessary SQL security joins and checks, the server is advantageously delegated the job of interpreting the markers and translating them into SQL.

On the other hand, if the security markers were to be set by server (based on the SQL portions of the query parts sent to it by the client), the server would need to re-parse the SQL string, then rebuild a tree representing the query in order to determine where to do the access control checks. This would result in slow server performance and duplicated work on the client and server systems. Thus, it is advantageous to perform the initial query-to-SQL translation on the client system. Such division of labor is a major advantage of the preferred embodiment.

Still further, concepts of the present application provide a one-pass query to the referenced database. After the client-side software generates an SQL statement for the user query, the server-side software adds all of the relevant security checks. The resulting SQL statement is then executed against the database. By putting both the user constraints and the security access control checks in the same query, it is ensured that only a single SQL query is executed regardless of the complexity of the user query, the security checks, and the number of items that are intermediates in the query. The resultant reduction in overhead is proportional to the number of different database objects traversed in the query. For example, A=>B=>C only requires one check, rather than three, to see if user has permission to access items A, B and C. This also advantageously allows the DBMS to apply optimization to the SQL statement that contains both the main query and the ACL checks.

The invention has been described with reference to the preferred embodiments. Modifications and alterations will occur to others upon a reading and understanding of the specification. It is our intention to include all such modifications and alterations insofar as they come within the scope of the appended claims, or the equivalents thereof.

The invention claimed is:

1. In a networked client-server computer system having a plurality of users of the client-server system and including software performing database queries via a database management system (DBMS) for users of the system, a method of two-phase query security, the method comprising:
   receiving by the client system a query string from one of the plurality of users, the query string including references to database objects;
   transforming the received query string by the client system to an intermediate query string;
   performing a first phase query security by the client system including:
      identifying the referenced database objects; and
      inserting a security marker into the intermediate query string for each respective identified database object, thereby forming respective pairs of query parts and marker parts;
   transferring the intermediate query string, including the query parts and the marker parts, to the server system;
   performing access control checks in a second phase query security by the server system on the inserted security markers in the intermediate query string; and
   replacing each of the inserted security markers in the second phase query security by the server system with a corresponding security check string to enforce access control.

2. The method as set forth in claim 1, wherein the transforming includes transforming the received query string by the client system to said intermediate query string as a structured query language (SQL) string.

3. The method as set forth in claim 2, wherein the transforming includes:
   transforming the query string into a parse tree;
   transforming the parse tree into an SQL tree; and
   transforming the SQL tree into an SQL string.

4. The method as set forth in claim 3, wherein the replacing includes replacing the inserted security markers with DBMS code.

5. The method as set forth in claim 4, wherein the DBMS code includes at least one of SQL joins and SQL conditions.

6. A client-server computer system having a plurality of users of the system comprising a networked client-server computer system having a plurality of users of the network system and including software performing database queries via a database management system (DBMS) for users of the system, including:
   a client system for receiving user queries;
   a server system for resolving the user queries;
   a communication network connecting the client system and the server system;
   client-side software running on the client system, including:
      means for transforming a received query into an intermediate query string;
      means for identifying database objects included in the received query;
      means for inserting a security marker into the intermediate query string for each identified database object, thereby forming respective pairs of query parts and marker parts;
      means for sending the intermediate query string, including the query parts and the marker parts, to the server system; and
      means for receiving a resolved query from the server system;
   server-side software running on the server system, including:
      means for performing access control checks on each of the inserted security markers in a received query string;
      means for replacing each of the inserted security markers in the received intermediate query string with respective security check strings for enforcing access control;
      means for submitting the received intermediate query string to a DBMS;
      means for receiving a query response from the DBMS; and
      means for returning the query response to the client system;
   a database connected to the server system; and
   a DBMS running on the server system for accessing the database and resolving received query strings and returning a resolved query response.

7. The client-server computer system as set forth in claim 6, further including:
   means for transforming the received query into a parse tree;
   means for transforming the parse tree into a structured query language (SQL) tree; and
   means for transforming the SQL tree into an SQL string, wherein the SQL string is the intermediate query string.

8. The client-server computer system as set forth in claim 7, wherein the security check strings include DBMS code.

9. The client-server computer system as set forth in claim 8, wherein the DBMS code includes at least one of SQL joins and SQL conditions.

10. The client-server computer system as set forth in claim 9, wherein the database is one of a relational database, an object-relational database and a data repository.

11. An article of computer-readable media having contents that cause a client-server computer system having a plurality of users of the network, and including software running on the client-server computer system, performing database queries via a database management system (DBMS) for users of the system to perform the computer-implemented steps of:
- receiving by the client system a query string from one of the plurality of users, the query string including references to database objects;
- transforming the received query string by the client system to an intermediate query string;
- performing a first phase query security by the client system including:
  - identifying the referenced database objects; and
  - inserting a security marker into the intermediate query string for each respective identified database object, thereby forming respective pairs of query parts and marker parts;
- transferring the intermediate query string, including the query parts and the marker parts, to the server system;
- performing access control checks in a second phase query security by the server system on the inserted security markers in the intermediate query string; and
- replacing each of the inserted security markers in the second phase query security by the server system with a corresponding security check string to enforce access control.

12. The article of computer-readable media as set forth in claim 11, wherein the transforming includes transforming the received query string by the client system to said intermediate query string as a structured query language (SQL) string.

13. The article of computer-readable media as set forth in claim 12, wherein the transforming includes:
- transforming the query string into a parse tree;
- transforming the parse tree into an SQL tree; and
- transforming the SQL tree into an SQL string.

14. The article of computer-readable media as set forth in claim 13, wherein the security check strings include DBMS code.

15. The article of computer-readable media as set forth in claim 14, wherein the DBMS code includes at least one of SQL joins and SQL conditions.

* * * * *